US012005563B2

(12) United States Patent
Barongan

(10) Patent No.: US 12,005,563 B2
(45) **Date of Patent: *Jun. 11, 2024**

(54) HAND TOOL DEVICE

(71) Applicant: Mark Gelido Barongan, San Diego, CA (US)

(72) Inventor: Mark Gelido Barongan, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,559

(22) Filed: Nov. 30, 2022

(65) Prior Publication Data

US 2023/0100771 A1 Mar. 30, 2023

Related U.S. Application Data

(63) Continuation of application No. 16/292,518, filed on Mar. 5, 2019, now Pat. No. 11,607,797.

(51) Int. Cl.

| | |
|---|---|
| ***B25G 1/10*** | (2006.01) |
| ***B25B 13/46*** | (2006.01) |
| ***B25B 23/00*** | (2006.01) |
| ***B25B 23/16*** | (2006.01) |

(52) U.S. Cl.

CPC ............ *B25G 1/102* (2013.01); *B25B 13/462* (2013.01); *B25B 23/0007* (2013.01); *B25B 23/16* (2013.01)

(58) Field of Classification Search

CPC ... B25G 1/102; B25B 13/462; B25B 23/0007; B25B 23/16

USPC ...................................................... 81/60, 489

See application file for complete search history.

(56) References Cited

U.S. PATENT DOCUMENTS

| | | | | | |
|---|---|---|---|---|---|
| 1,437,475 | A * | 12/1922 | Moyer | B25G 1/105 | 81/177.5 |
| 5,609,175 | A * | 3/1997 | Gerry | A45B 9/02 | 135/25.4 |
| 5,921,157 | A * | 7/1999 | Smith | B25B 13/461 | 81/177.5 |
| 7,480,964 | B2 * | 1/2009 | Vidal | B25G 1/102 | 16/442 |
| 8,707,833 | B1 * | 4/2014 | Gedeon | B25B 7/10 | 81/414 |

* cited by examiner

*Primary Examiner* — Hadi Shakeri

(74) *Attorney, Agent, or Firm* — Allison M. Corder, Esq.

(57) ABSTRACT

A hand tool including a control element for receiving one or more finger digits of a user. The control element is positioned on the body component and may be in the form of an aperture defined by a perimeter surface. A user places one or more fingers within the control element and applies pressure to rotate the body component.

8 Claims, 16 Drawing Sheets

HAND TOOL DEVICE

CROSS-REFERENCE TO RELATED APPLICATIONS

This application claims the benefit of U.S. application Ser. No. 16/292,518 filed Mar. 5, 2019, incorporated by reference.

TECHNICAL FIELD OF INVENTION

The invention relates generally to hand tools and more specifically to hand tools for turning hardware to tighten or loosen it.

BACKGROUND OF INVENTION

There are many hand tools, such as wrenches and ratchet tools (otherwise referred to a socket wrench), that allow a user like a car mechanic to turn hardware to tighten or loosen it. For purposes of this application, the term "hardware" refers to a fastener such as a nut or a bolt, but any hardware is contemplated that may require a hand tool to turn it in order to tighten or loosen it, e.g., a screw.

Hand tools include fixed socket, interchangeable socket, and powered or pneumatic. Examples of these include adjustable wrench, combination wrench, open-end wrench, basin wrench, pipe wrench, Allen wrench, lug wrench, nut driver, flex-head socket, torque wrench, swivel-head, pneumatic impact wrenches, hydraulic torque wrenches, torque multipliers and breaker bars. Certain of these require an electrical source and a specific horsepower for operation. Battery operated drills and impact wrenches may be used with adaptive sockets which allow them to function like pneumatic ratchets, but batteries must be recharged such as through an electrical source.

FIG. 1A illustrates a hand tool in the form of a conventional ratchet tool 10, or socket wrench. FIG. 1B illustrates a conventional ratchet tool 10 with an extension bar 13 attached. FIG. 2A illustrates a conventional ratchet tool 10 with socket 15. And FIG. 2B illustrates a conventional ratchet tool 10 with both an extension bar 13 and socket 15.

Ratchet tool 10 includes a handle 18 and a head portion 12. The head portion 12 houses a ratcheting mechanism. A male drive unit 14 is coupled to the ratcheting mechanism. Although the ratchet tool 10 shown in FIG. 1A includes a ratcheting mechanism housed within a head portion 12, ratchet tools without a ratcheting mechanism are also contemplated. Examples of these types of ratchet tools include an articulating male drive unit that only moves 180 degrees in one plane, or a male drive unit fixed to the handle. Typically, the size of the male drive unit 14 is ¼ inch to greater than 2 inches in width. The male drive unit 14 cooperates with either a female drive unit 16 of a socket 15 or a receptacle 21 of an extension bar 13.

An extension bar can be used with a socket to help reach into confined and awkward spaces that you would not otherwise be able to access. The extension bar 13 includes a male component 20 that engages with a female drive unit 16 of a socket 15. The cooperative drive units 14, 16 are most commonly square in shape, but may also be other shapes, e.g., double square, rectangular, single hex, double hex, etc.

The socket 15 is configured to attach to hardware 11 and are identified by its size. Sockets vary in depth and width from regular size and deep sockets. Standard sizes of square drive unit sizes around the world include ¼", ⅜", ½", ¾", 1", 1½", 2½" and 3½". With the male drive unit 14 attached to a socket 15 (with or without an extension bar 13), a hardware receiving end 17 of the socket 15 attaches to hardware.

The head 12 includes one or more gear and pawl, which allow hardware to be tightened or loosened with an oscillating motion provided via handle 18, without requiring that the ratchet tool 10 be removed and refitted after each turn. Pulled or pushed in one direction, the ratchet loosens or tightens the hardware 11 attached to the socket 15. Turned the other direction, the ratchet does not turn the socket 15 but allows the ratchet handle 18 to be re-positioned for another turn while staying attached to the hardware 11. This ratcheting action allows the hardware 11 to be rapidly tightened or loosened in small increments without disconnecting the ratchet tool 10 from the hardware 11. A user typically uses one hand to push or pull the ratchet via the handle 18 while the other hand stabilizes the head 12 attached to the socket 15. Typically, the ratchet tool 10 is rotated clockwise or counterclockwise a distance of 0-30 degrees with respect to the hardware 11. Rotation of the ratchet handle 18 a distance of 0-30 degrees translates to the attached socket 15 and turns the attached hardware 11 the same degree the ratchet handle 18 is rotated.

To tighten or loosen hardware using a hand tool without a ratcheting mechanism, such as a wrench, a ratchet tool device is typically attached to hardware and rotated 0-30 degrees, separated from hardware and repositioned on the hardware, and then rotated an additional 0-30 degrees. This process may continue until the hardware is tightened or loosened as desired.

Ideally, a 90 degree angle—as defined by the vertical centerline of the socket 15 and working surface 19—is desired to be maintained during operation of the ratchet tool. But as a user operates a conventional ratchet tool, the socket 15 can "wobble' out of the ideal 90 degree angle when the user grasps at the head 12 and handle 18 during operation. This may result in the user inadvertently operating the tool at some angle less than optimum, which may cause damage to the ratchet tool 10 or hardware 11. Marring of a bolt head or nut is not desirable.

Ratchet tools are limited by the distance (0-30 degrees) they can rotate, and therefore limit the distance (90-0 degrees) the hardware can be turned to loosen or tighten it. Furthermore, conventional ratchet tools "wobble" when operated. What is needed is an improved hand tool that overcomes these limitations. The present invention satisfies this need.

SUMMARY OF INVENTION

The invention is directed to a hand tool device used to turn hardware to tighten or loosen it. The hand tool device includes a control element for receiving one or more finger digits of a user. The control element is positioned on the body component of the hand tool device between a first end and a second end and may be in the form of an aperture defined by a perimeter surface. A user places one or more fingers within the control element and applies pressure to rotate the body component. The hand tool device may be rotated a full and continuous 360 degrees overcoming the limited distance conventional hand tools can operate. This greater range of distance as compared to conventional tools permits hardware to be loosened or tightened more quickly and efficiently.

The control element according to the invention may be applied to ratchet tools as well as other hand tools such as an adjustable wrench, combination wrench, open-end wrench, basin wrench, pipe wrench, Allen wrench, lug wrench, nut driver, flex-head socket, torque wrench, swivel-head, pneumatic impact wrenches, hydraulic torque wrenches, torque multipliers and breaker bars.

The control element permits the hand tool device to operate at or near the optimum angle of 90 degrees as defined by the vertical centerline of the socket and working surface reducing damage to hardware, e.g., marred bolt head. Furthermore, the control element may reduce or eliminate "wobble" of a socket during operation of a ratchet tool.

Certain embodiments of the hand tool device may comprise two or more body components, each with one or more control elements. For example, the hand tool may include four body components, each with two control elements (eight total).

The invention and its attributes and advantages will be further understood and appreciated from a reading of the description below with reference to the accompanying drawings.

DESCRIPTION OF PREFERRED EMBODIMENT

Although the invention is described with respect to a hand tool in the form of a ratchet tool device, other hand tools are contemplated. For example, one or more control elements may be used with an adjustable wrench, combination wrench, open-end wrench, basin wrench, pipe wrench, Allen wrench, lug wrench, nut driver, flex-head socket, torque wrench, swivel-head, pneumatic impact wrenches, hydraulic torque wrenches, torque multipliers and breaker bars.

Figure 1A:
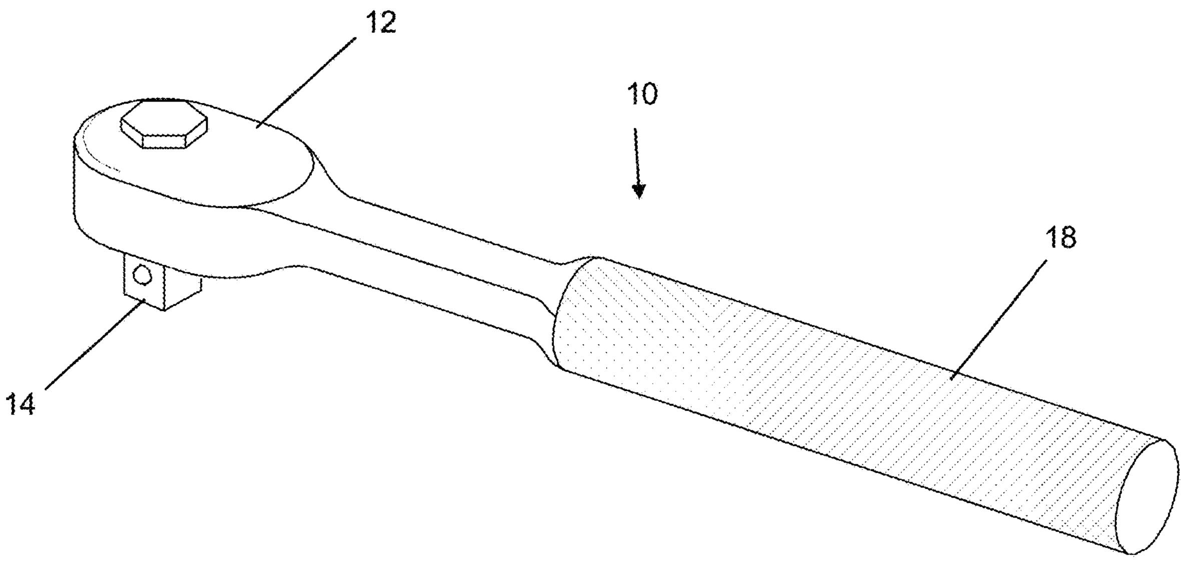
FIG. 1A PRIOR ART
FIG. 1A illustrates a perspective view of a conventional ratchet tool.
Figure 1B:
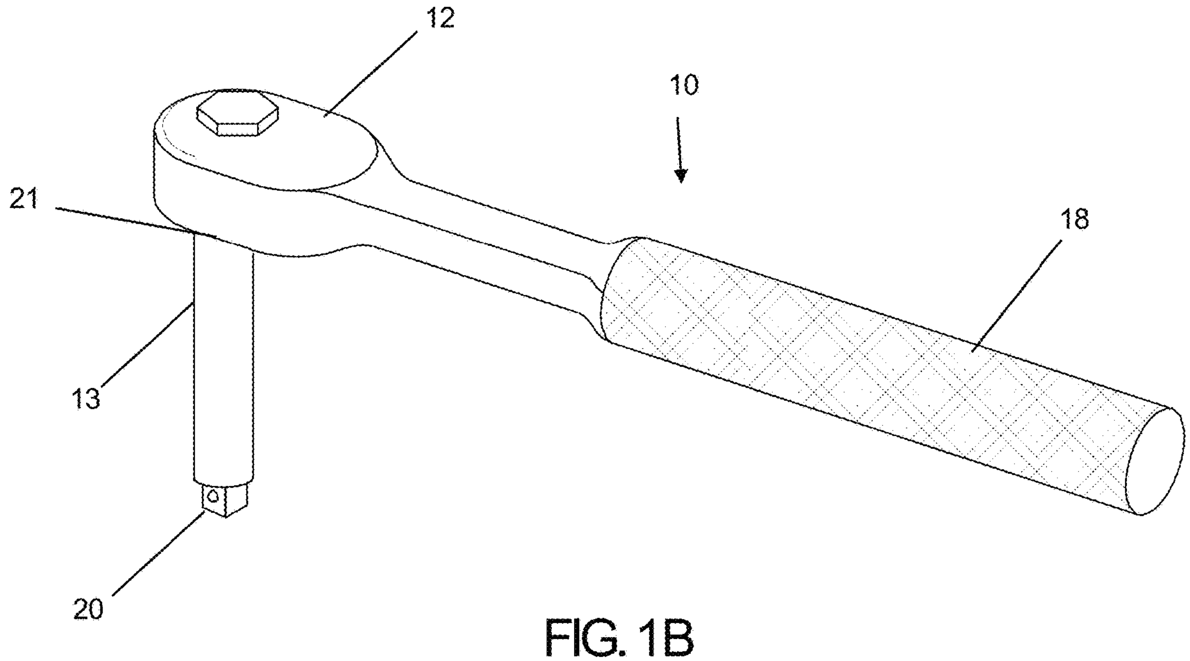
FIG. 1B PRIOR ART
FIG. 1B illustrates a perspective view of a conventional ratchet tool with an extension bar attached.
Figure 2A:
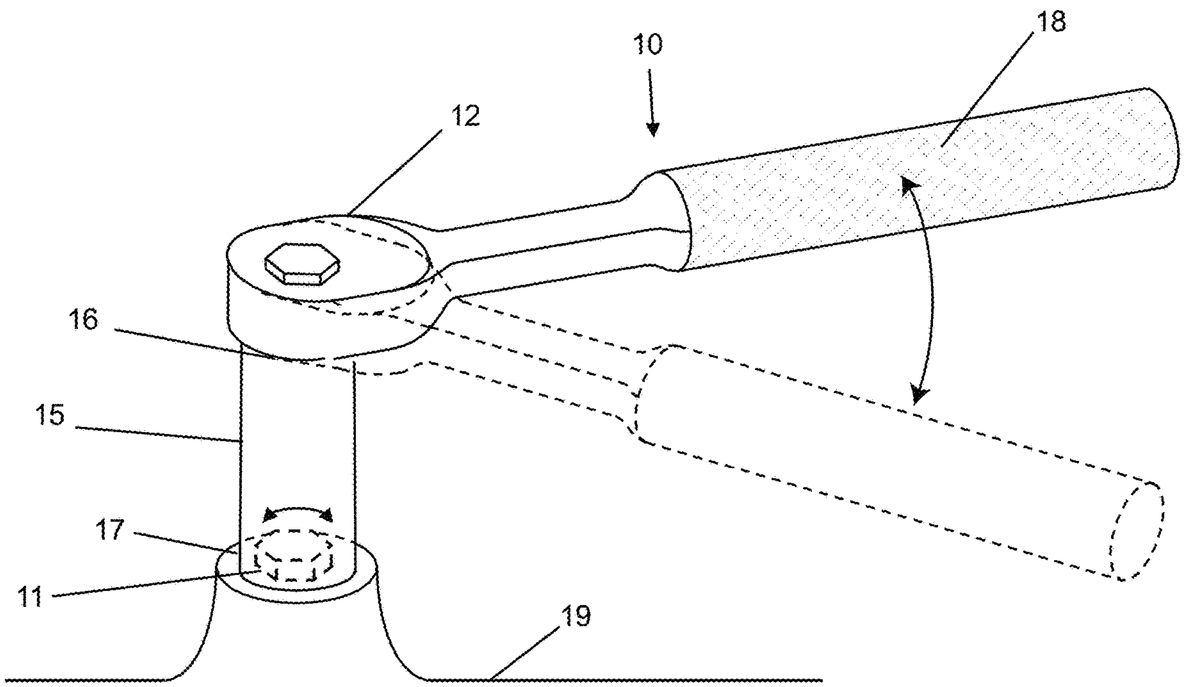
FIG. 2A PRIOR ART
FIG. 2A illustrates a perspective view of a conventional ratchet tool with socket.
Figure 2B:
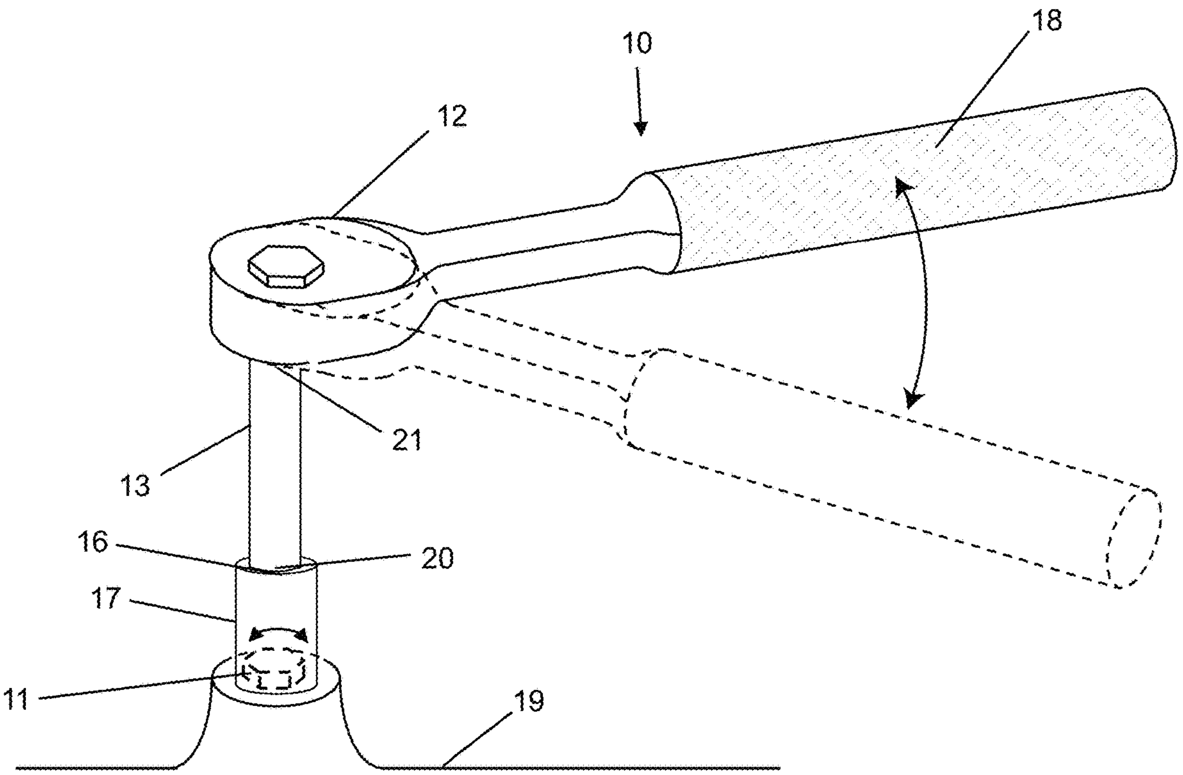
FIG. 2B PRIOR ART
FIG. 2B illustrates a perspective view of a conventional ratchet tool with both an extension bar and socket.
Figure 3:
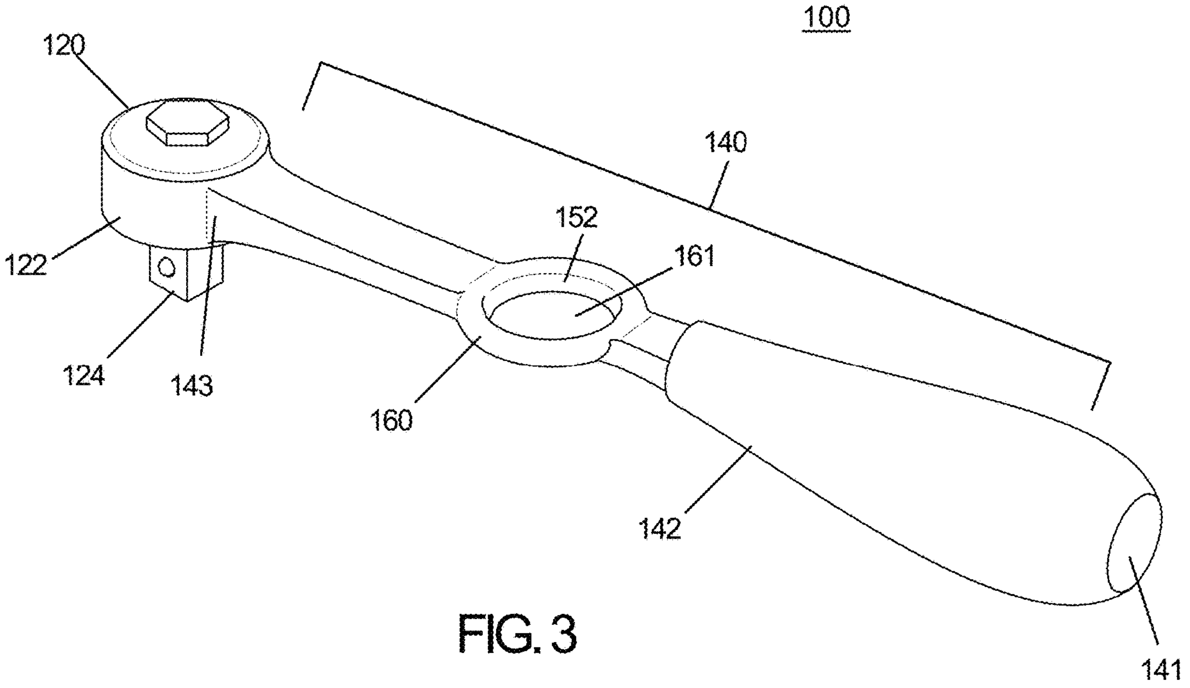
FIG. 3 is a perspective view of a ratchet tool according to one embodiment of the invention.

FIG. 3 illustrates a hand tool in the form of a ratchet tool device 100 according to one embodiment of the present invention. The ratchet tool device 100 includes a head component 120 and a body component 140. A ratcheting mechanism 122 is housed within the head component 120. The head component 120 also includes a male drive unit 124. The male drive unit 124 of the head component 120 may be of any shape to receive a female drive unit of a socket or a receptacle of an extension bar.

The body component 140 of ratchet tool device 100 extends from a first end 141 terminating at the head component 120 to a second end 143. A control element 160 is positioned on the body component 140. As shown in FIG. 3, the control element 160 is centrally positioned on the body component 140 between the first end 141 and the second end 143 and is in the form of an aperture 161. Aperture 161 is defined by a perimeter surface 152, shown as a circular perimeter surface; however, it is contemplated that control element 160 can be of any size and/or shape and positioned anywhere on the body component 140, as described in further detail below.

The body component 140 may further include a handle element 142, which may also be weighted. Body component 140 may be of any length and be made from a variety of materials, including stainless steel, powder-coated aluminum, rubber or plastic.

Figure 4:
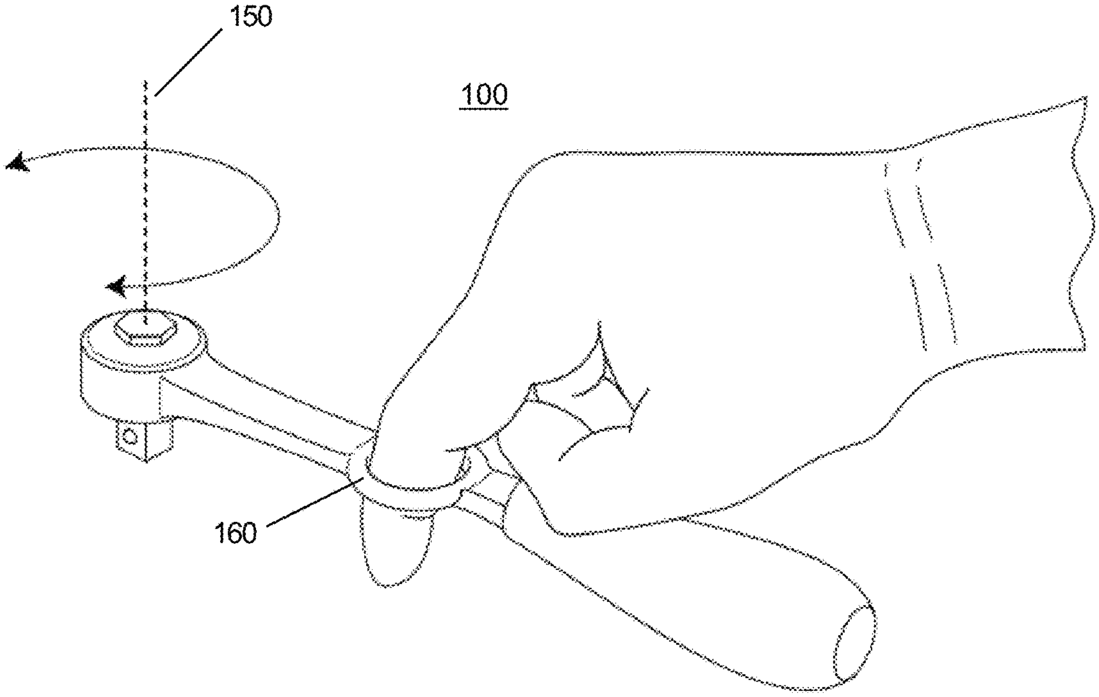
FIG. 4 illustrates one example of how a user may operate the ratchet tool shown in FIG. 3.

FIG. 4 illustrates how a user may utilize control element 160 to operate ratchet tool device 100 as shown in FIG. 3. Specifically, the user places one or more fingers within aperture 161 and rotates the body component 140 around axis 150. Specifically, a user applies pressure against the perimeter surface 152 of the aperture 161. This method of operation permits a full and continuous rotation (360 degrees) of the ratchet tool device 100, and therefore facilitates loosening or tightening hardware more quickly and efficiently. And provides a more stable connection between the socket and the hardware to minizine wobbling of the socket during operation, which is commonly associated with damage to the ratchet tool device 100 or hardware itself.

Figure 5:
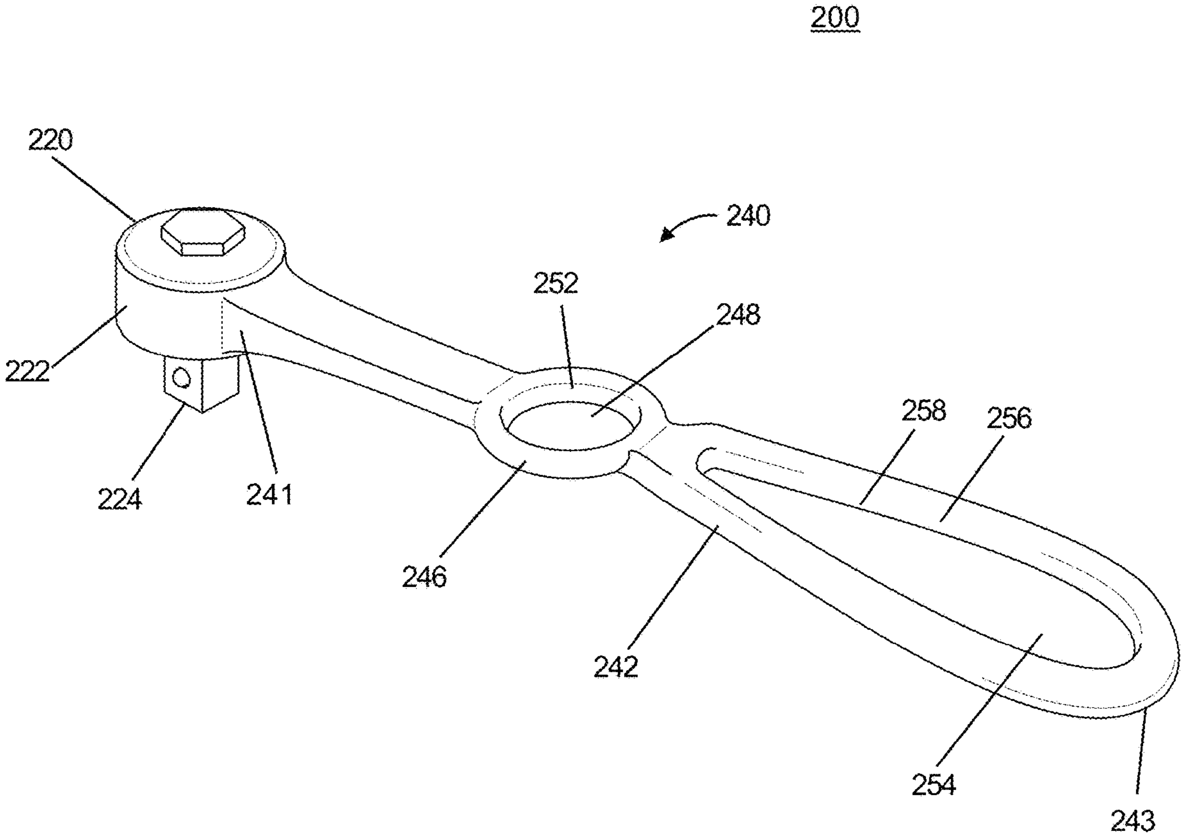
FIG. 5 is a perspective view of another ratchet tool according to one embodiment of the invention.

FIG. 5 illustrates another embodiment of a ratchet tool device 200. As with ratchet tool device 100 of FIG. 3, ratchet tool device 200 includes a head component 220. Head component 220 includes a ratcheting mechanism 222 and a male drive unit 224. Male drive unit 224 may be of any shape to receive a female drive unit of a socket to, for example, tighten or loosen hardware.

Ratchet tool device 200 further includes a body component 240. The body component 240 of ratchet tool device 200 extends from a first end 241 terminating at the head component 220 to a second end 243. As shown in FIG. 5, a finger control element 246 is centrally positioned on the body component 240 positioned between the first end 241 and the second end 243 and is in the form of an aperture 248. As shown in FIG. 5, aperture 248 is defined by a perimeter surface 252, shown as a circular perimeter surface; however, it is contemplated that finger control element 246 can be of any size and/or shape and positioned anywhere on the body component 240.

As shown in FIG. 5, ratchet tool device 200 further includes a hand control element 242. Hand control element 242 is in the form of an opening 254 defined by an inner surface 258. Opening 254 is ovoid in shape and sized to receive a one or more finger digits. While an ovoid shape is useful for providing a grip that is easily grasped in a human hand, the opening 254 may take other shapes, such as circular, semi-circular, or elliptical.

Certain embodiments of the ratchet tool device 200 may also include a grip surface 256 that extends partially or entirely over the hand control element 242. Any suitable grip surface, such as a rubber or synthetic material may be used. The grip surface 256 may include a recess and other shapes to improve comfort and grip of the hand control element 242. In certain embodiments, portions of the hand control element 242, such as inner surface 258, may include a suitable grip surface, while the remainder of the hand control element 242 is constructed of a less tactile material, such as metal or plastic.

In certain preferred embodiments, the finger control element 246 and hand control element 242 facilitate operating the ratchet tool device 200 in a number of different ways. In one operation, a user can place one digit—such as an index finger—in aperture 248 of finger control element 246 and the remaining fingers in opening 254 of hand control element 242 to rotate the ratchet tool device clockwise or counterclockwise. In another operation, a user may insert all finger digits into opening 254 and grip the inner surface 258 or outer surface 256 with the entire hand to tighten or loosen hardware.

In certain preferred embodiments, the ratchet tool device 200 may comprise a system of modular or interchangeable elements. For example, one or more interchangeable control elements may be connected to body component 240 of ratchet tool device 200 so that the user can customize the shape, texture, appearance or diameter of an opening. For example, hand control element 242 may be made with or replaced with handle element 142 of FIG. 3 based on a user preference.

Figure 6:
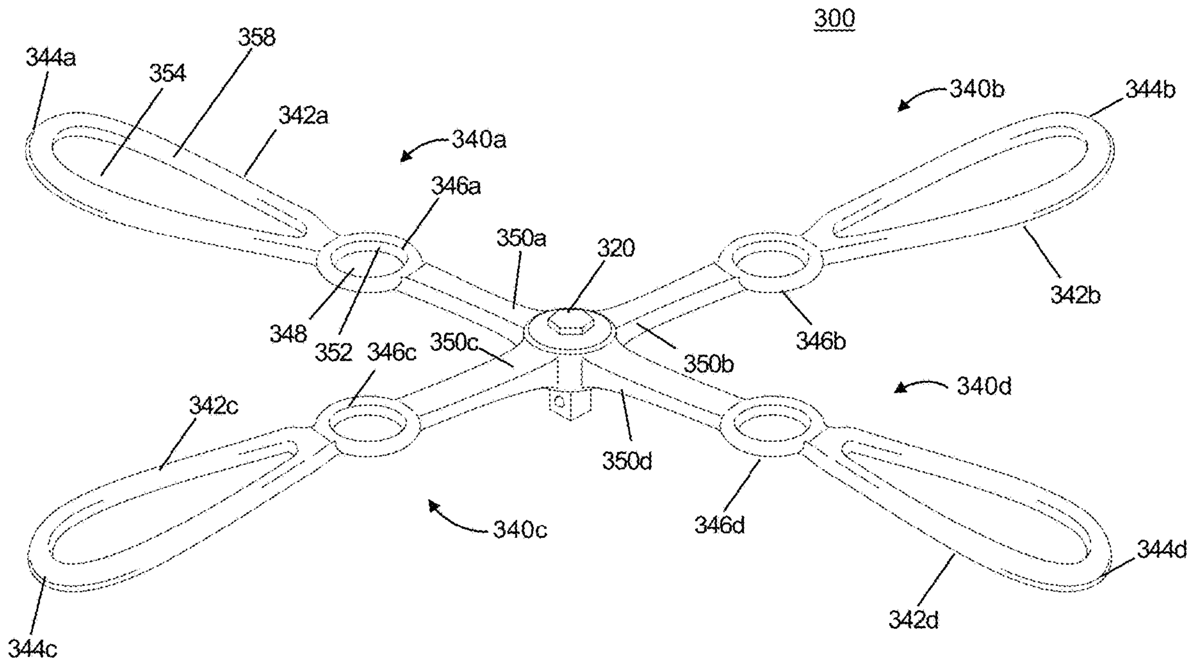
FIG. 6 is a perspective view of another ratchet tool according to one embodiment of the invention.

FIG. 6 illustrates a ratchet tool device 300 comprising a head component 320 and four body components 340*a*, 340*b*, 340*c*, 340*d*. While ratchet tool device 300 is shown to have four body components, any number of body components is contemplated. Each body component 340*a*, 340*b*, 340*c*, 340*d* of ratchet tool device 300 includes a finger control element 346*a*, 346*b*, 346*c*, 346*d* positioned between a first end 350*a*, 350*b*, 350*c*, 350*d* and a second end 344*a*, 344*b*, 344*c*, 344*d* of the respective body component 340*a*, 340*b*, 340*c*, 340*d*. As shown in FIG. 6, each finger control element 346*a*, 346*b*, 346*c*, 346*d* is in the form of an aperture, such as aperture 348 defined by a perimeter surface 352; however, it is contemplated that one or more finger control element 346*a*, 346*b*, 346*c*, 346*d* can be of any size and/or shape and positioned anywhere on the corresponding body component 340*a*, 340*b*, 340*c*, 340*d*. For example, a ratchet tool device may include one or more body components with no finger control elements or include two or more finger control elements.

Each body component 340*a*, 340*b*, 340*c*, 340*d* of ratchet tool device 300 further includes a hand control element 342*a*, 342*b*, 342*c*, 342*d*. Hand control elements may be in the form of an opening, such as opening 354 defined by inner surface 358. Opening 354 is ovoid in shape and sized to receive a user's fingers. While an ovoid shape is useful for providing a grip that is easily grasped in a human hand, opening 354 may take other shapes, such as circular, semi-circular, or elliptical. It is further contemplated that ratchet tool device 300 may include one or more hand control elements having different shaped openings. For example, two hand control elements may have an opening in the shape of a circle while two other hand control elements have a square shaped opening.

Figure 7:
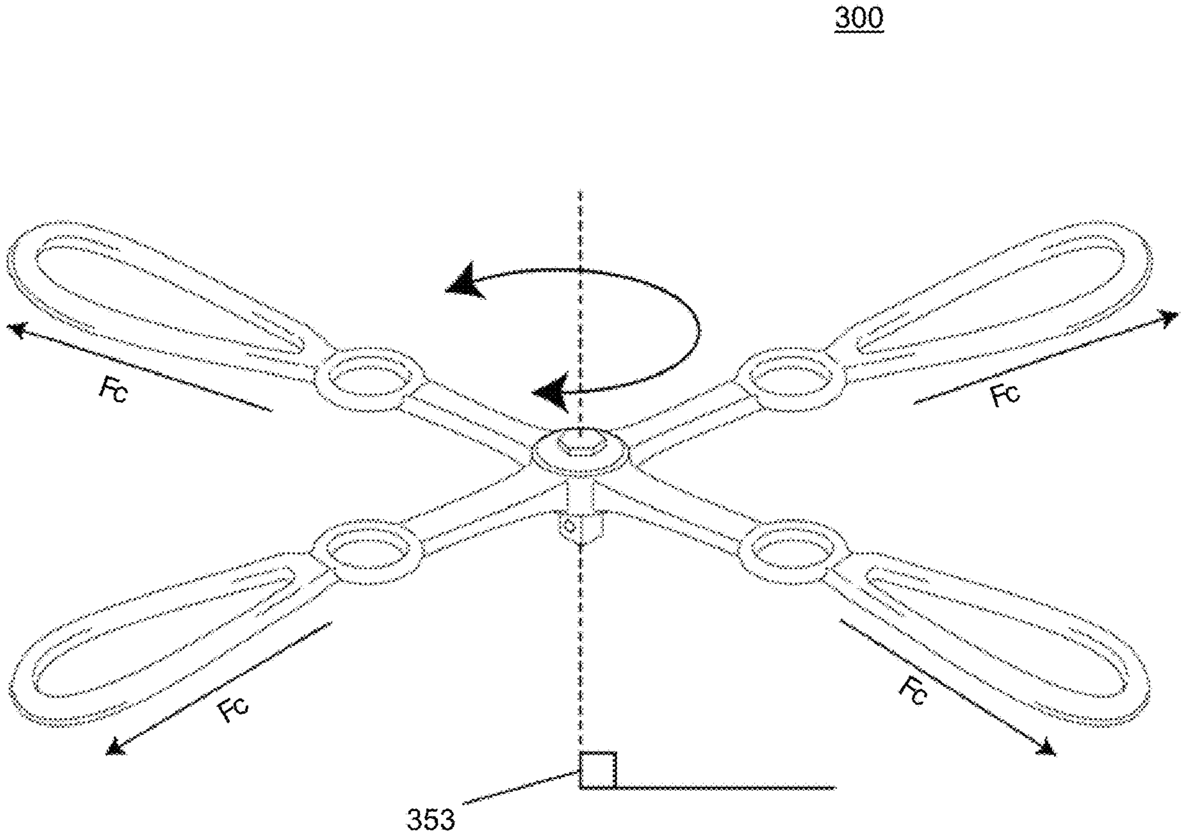
FIG. 7 illustrates the rotational direction of the ratchet tool shown in FIG. 6.

As shown in FIG. 7, a user may engage one or more finger control elements 346*a*, 346*b*, 346*c*, 346*d*, one or more hand control elements 342*a*, 342*b*, 342*c*, 342*d*, or combinations of each to rotate the ratchet tool device 300 clockwise or counterclockwise about axis 353. This facilitates quick and efficient tightening or loosening of hardware by allowing a user to apply a rotation with a greater range of distance as compared to conventional tools. In particular, while ratchet tool device 300 may be rotated 360 degrees, rotation of conventional tools is typically limited to a distance of 0-30 degrees, and therefore limited in the amount a user can turn the hardware to loosen or tighten it.

Figure 8A:
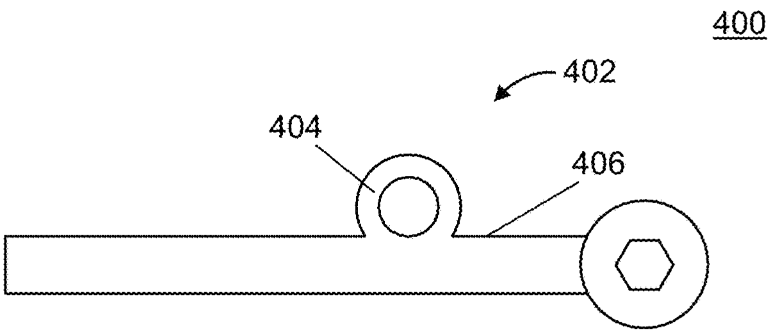
FIG. 8A is a top view of one embodiment of a ratchet tool according to the invention.
Figure 8B:
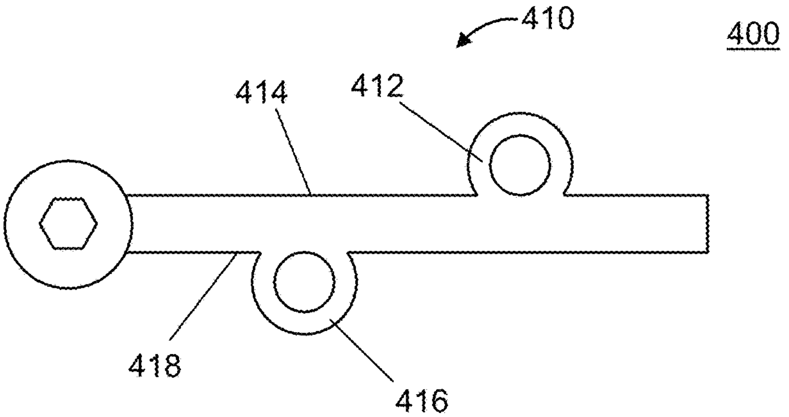
FIG. 8B is a top view of another embodiment of a ratchet tool according to the invention.

FIGS. 8A through 8D illustrate embodiments of a ratchet tool device 400. FIG. 8A illustrates the ratchet tool device 400 having a body component 402 that includes a finger control element 404 positioned along a perimeter edge 406 of the body component 402. FIG. 8B illustrates the ratchet tool device 400 having a body component 410 that includes a first finger control element 412 positioned along a first perimeter edge 414 of the body component 410 and a second finger control element 416 positioned along a second perimeter edge 418 of the body component 410.

Figure 8C:
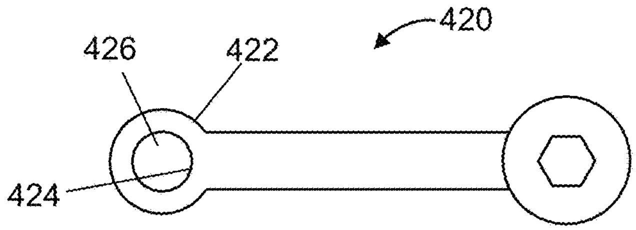
FIG. 8C is a top view of another embodiment of a ratchet tool according to the invention.
Figure 8D:
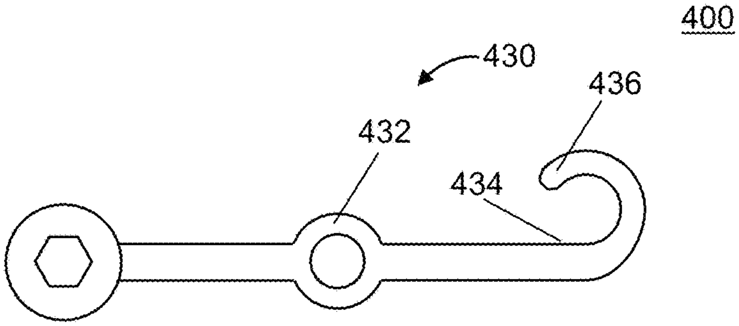
FIG. 8D is a top view of another embodiment of a ratchet tool according to the invention.

FIG. 8C illustrates the ratchet tool device 400 including a body component 420 comprising a hand control element 422 with an inner surface 424 having a circular opening 426. In certain embodiments, the inner surface 424 may further include a ratcheting mechanism, such as a pass-thru socket that is configured for long bolts and threaded rod to pass through the circular opening 426. This configuration of ratchet tool device 400 may be used in places where deep sockets are not long enough. FIG. 8D illustrates the ratchet tool device 400 including a body component 430 comprising a finger control element 432 and a hand control element 434 having a hook-shaped surface 436.

Figure 9A:
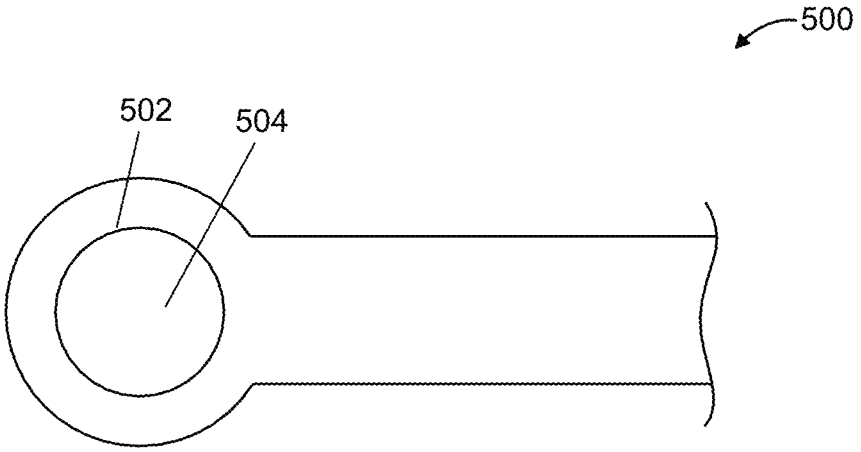
FIG. 9A is a top view of one embodiment of a body component according to the invention.
Figure 9B:
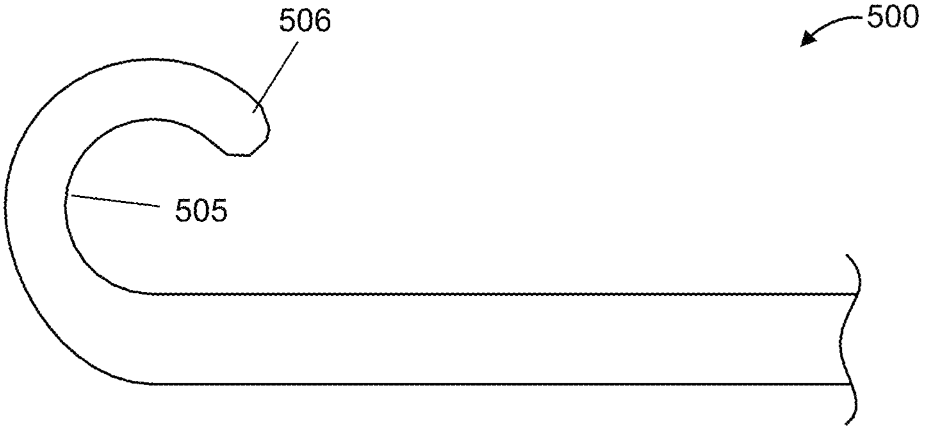
FIG. 9B is a top view of another embodiment of a body component according to the invention.
Figure 9C:
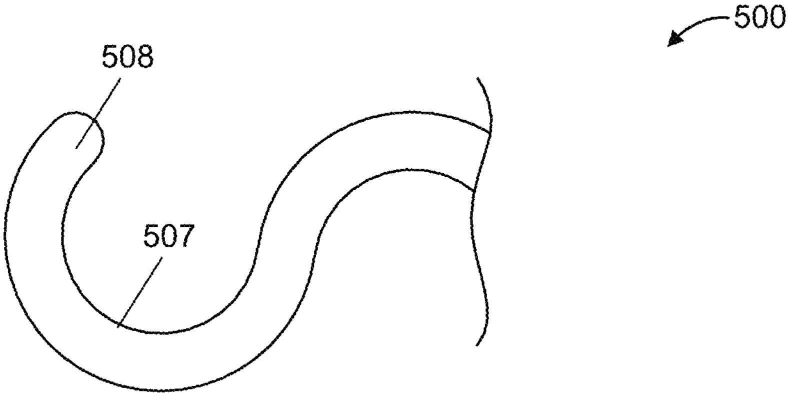
FIG. 9C is a top view of another embodiment of a body component according to the invention.
Figure 9D:
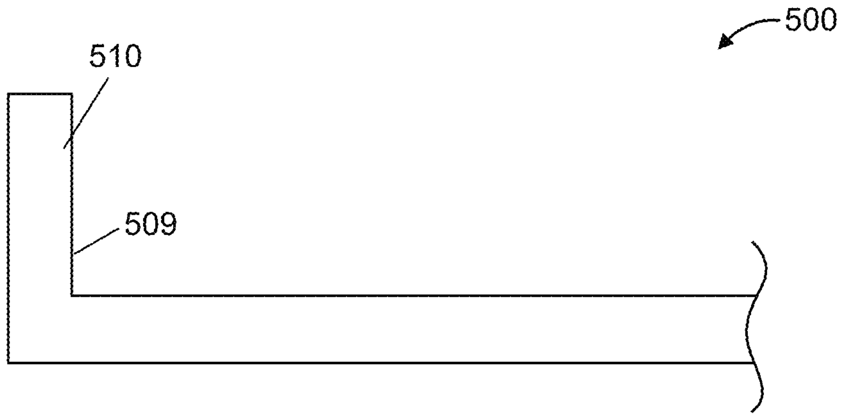
FIG. 9D is a top view of another embodiment of a body component according to the invention.
Figure 9E:
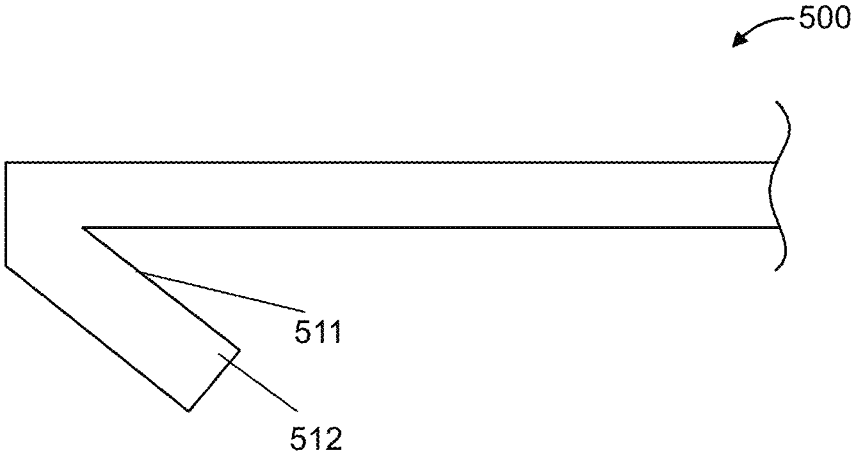
FIG. 9E is a top view of another embodiment of a body component according to the invention.
Figure 9F:
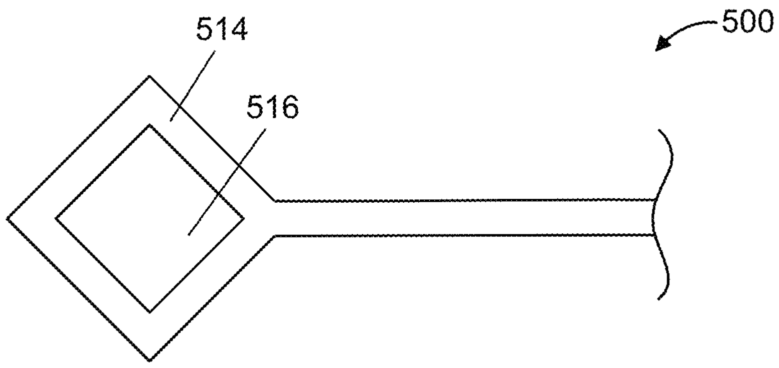
FIG. 9F is a top view of another embodiment of a body component according to the invention.

FIGS. 9A through 9E illustrate embodiments of a body component 500. FIG. 9A illustrates body component 500 having a circular control element 502 defined by a circular opening 504. FIG. 9B illustrates body component 500 having a rounded portion 505 defining a hook-shaped control element 506. FIG. 9C illustrates body component 500 having a curved portion 507 defining an S-shaped control element 508. FIG. 9D illustrates a linear portion 509 extending from body component 500 to form an L-shaped handle 510. FIG. 9E illustrates an angled portion 511 extending at an angle between 30 and 60 degrees with respect to the body component 500 to form a V-shaped control element 512. FIG. 9F illustrates control element 500 having a square-shaped control element 514 with a square-shaped opening 516.

In operation of the embodiments illustrated in FIGS. 9A through 9E, a user may operate a ratchet device by engaging a surface of a control element with one or more finger digits to rotate a ratchet tool device clockwise or counterclockwise.

Figure 10A:
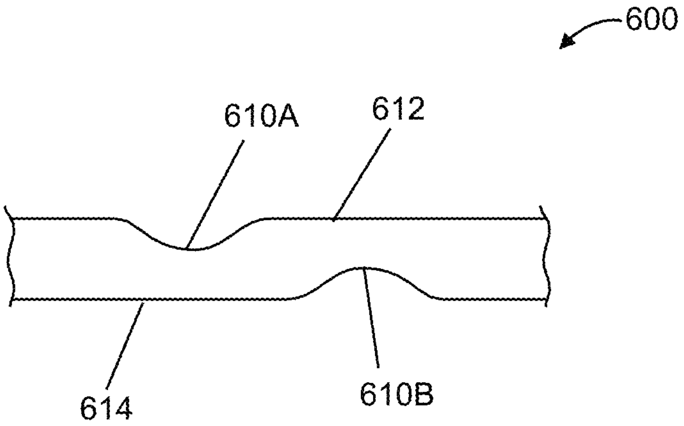
FIG. 10A is a top view of one embodiment of a body component according to the invention.
Figure 10B:
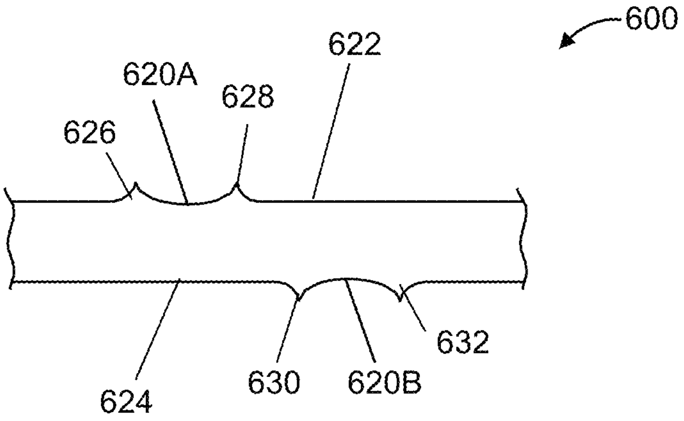
FIG. 10B is a top view of another embodiment of a body component according to the invention.

FIGS. 10A and 10B illustrate embodiments of a control element including a recessed portion on each perimeter edge of a body component 600. FIG. 10A illustrates a recessed portion 610Aon a first perimeter edge 612 and a recessed portion 610B on a second perimeter edge 614, each recessed portion 610A, 610B having a smooth transition to the body component 600. FIG. 10B illustrates a recessed portion 620Aon a first perimeter edge 622 and a recessed portion 620B on a second perimeter edge 624. As shown, the recessed portion 620A on the first perimeter edge 622 resides between tips 626, 628 and the recessed portion 620B on the second perimeter edge 624 resides between tips 630, 632.

FIGS. 11A through 11D illustrates a ratchet tool device 700 comprising a head component 710 and four body components 720, each body component 720 extending from a first end 725 to a second end 730. Ratchet tool device 700 further includes a control element positioned on the body component 720.

Figure 11A:
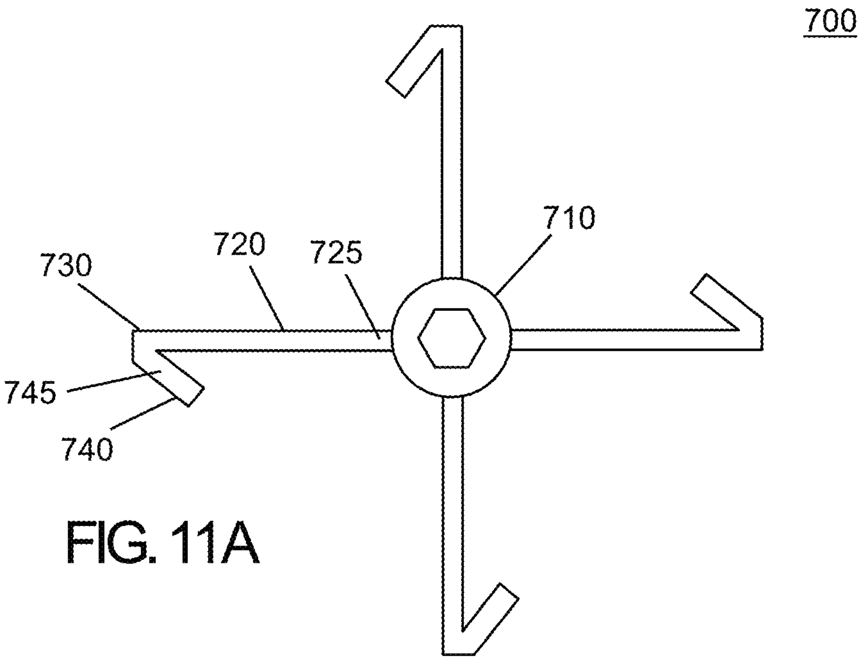
FIG. 11A is a top view of a ratchet tool including the control element shown in FIG. 9E according to one embodiment of the invention.
Figure 11B:
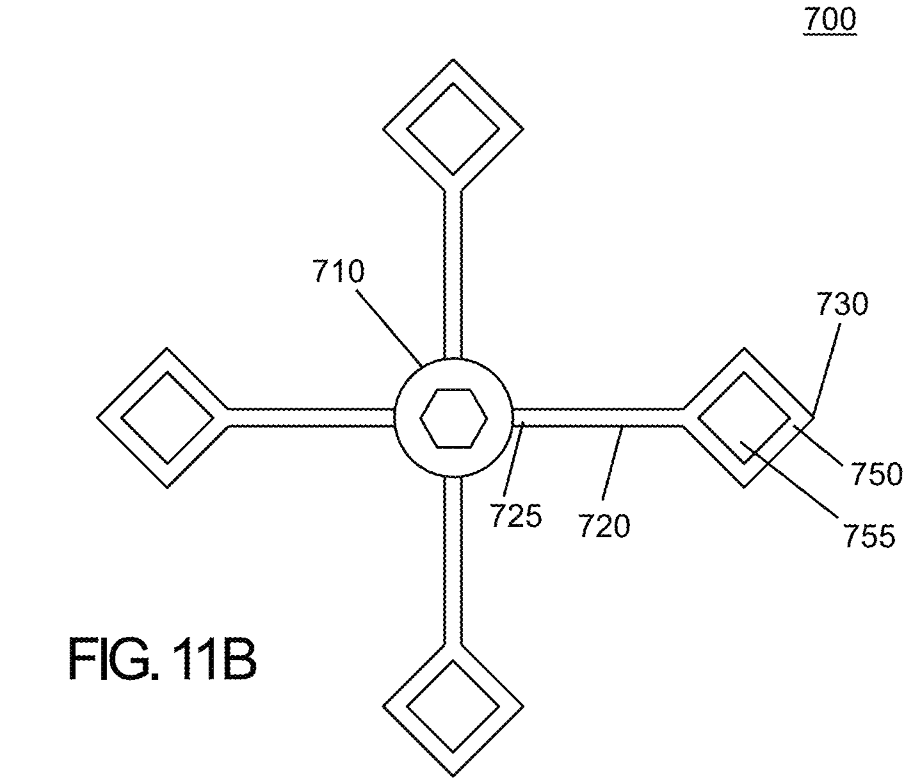
FIG. 11B is a top view of a ratchet tool including the control element shown in FIG. 9F according to one embodiment of the invention.
Figure 11C:
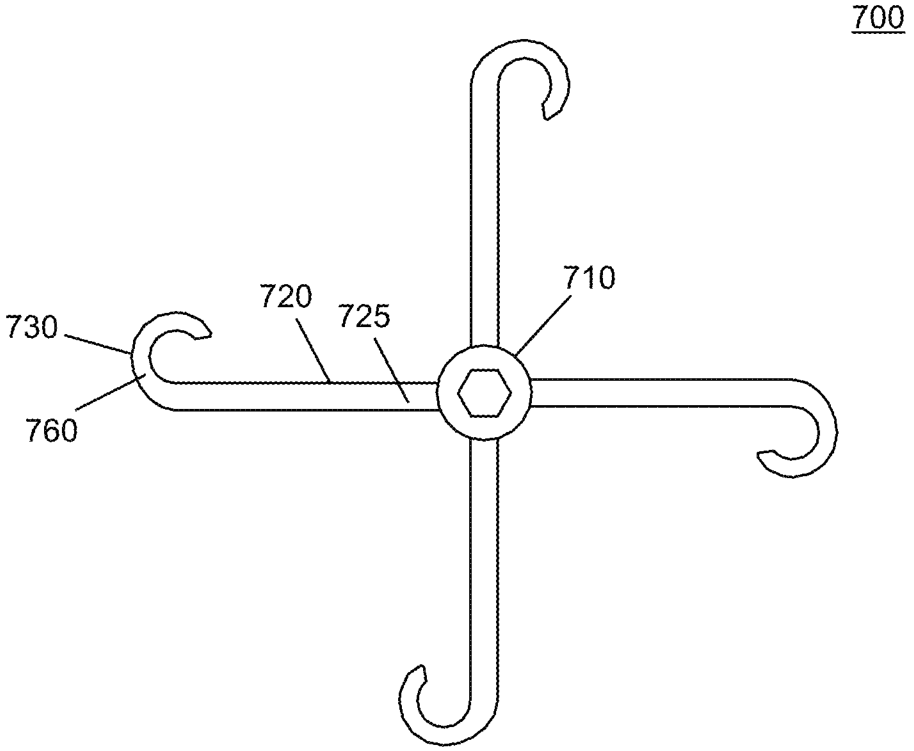
FIG. 11C is a top view of a ratchet tool including the control element shown in FIG. 9B according to one embodiment of the invention.
Figure 11D:
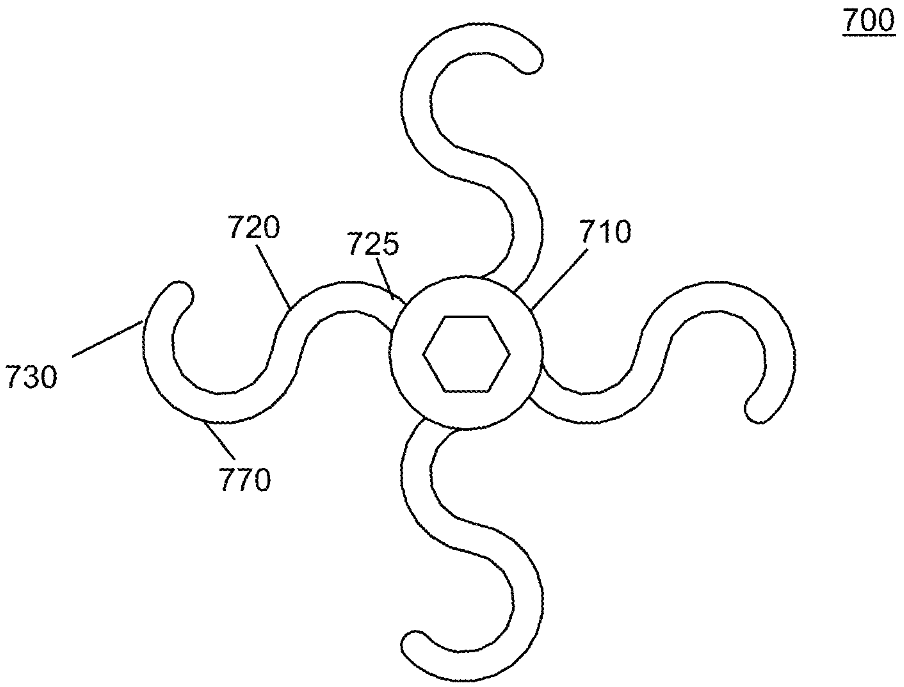
FIG. 11D is a top view of a ratchet tool including the control element shown in FIG. 9C according to one embodiment of the invention.

FIG. 11A illustrates an angled portion 745 extending at an angle with respect to each body component 720 to form a V-shaped control element 740 at the second end 730. FIG. 11B illustrates each body component 720 including a square-shaped control element 750 with a square-shaped opening 755. FIG. 11C illustrates each body component 720 including a hook-shaped control element 760 at the second end 730. FIG. 11D illustrates each body component 720 having a control element 770 that curves in a S-shape from the first end 725 to the second end 730.

Figure 12:
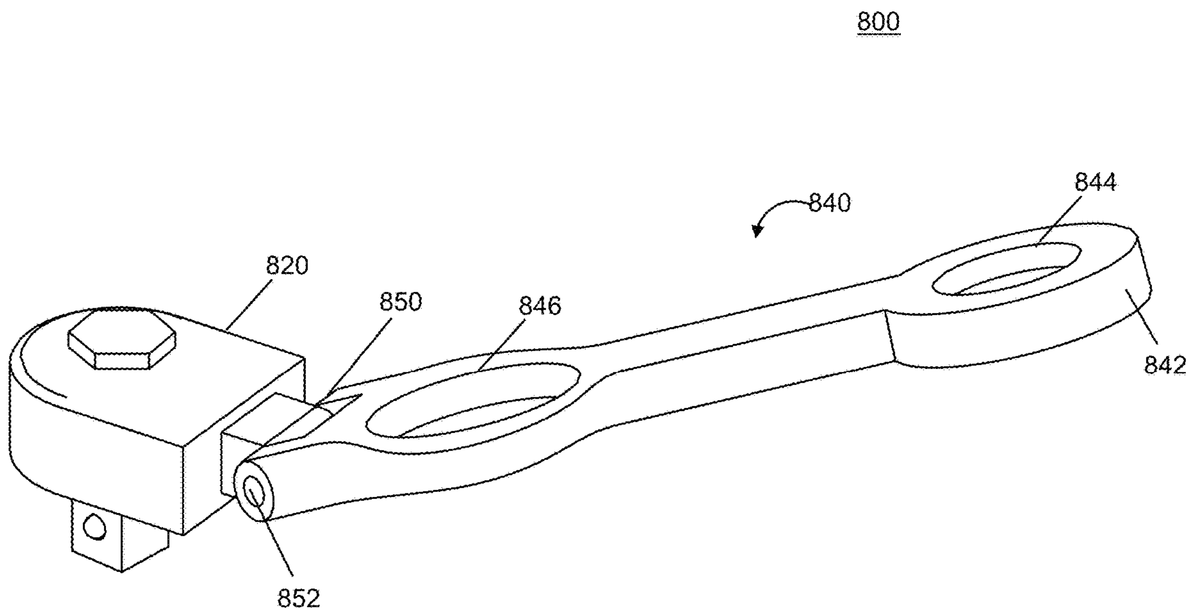
FIG. 12 is a perspective view of an alternate embodiment of a ratchet tool according to one embodiment of the invention.

FIG. 12 illustrates a ratchet tool device 800 including a body component 840 pivotally connected to a head component 820. Body component 840 includes a first control element 846 positioned between a first end 842 and a second end 850 of the body component 840. The first end 842 of the body component 840 is shown to include a second control element 844.

As shown in FIG. 12, the second end 850 comprises a hinge mechanism 852 pivotally connecting the body component 840 to the head component 820. The hinge mechanism 852 is configured to permit selective angular positioning of the body component 840 relative to the head component 820. In certain embodiments, hinge mechanism 852 may include a locked position and an unlocked position. In the unlocked position, the ratchet tool device 800 is adjustable. In the locked position, the ratchet tool device 800 may be fixed in a suitable position for use.

Figure 13:
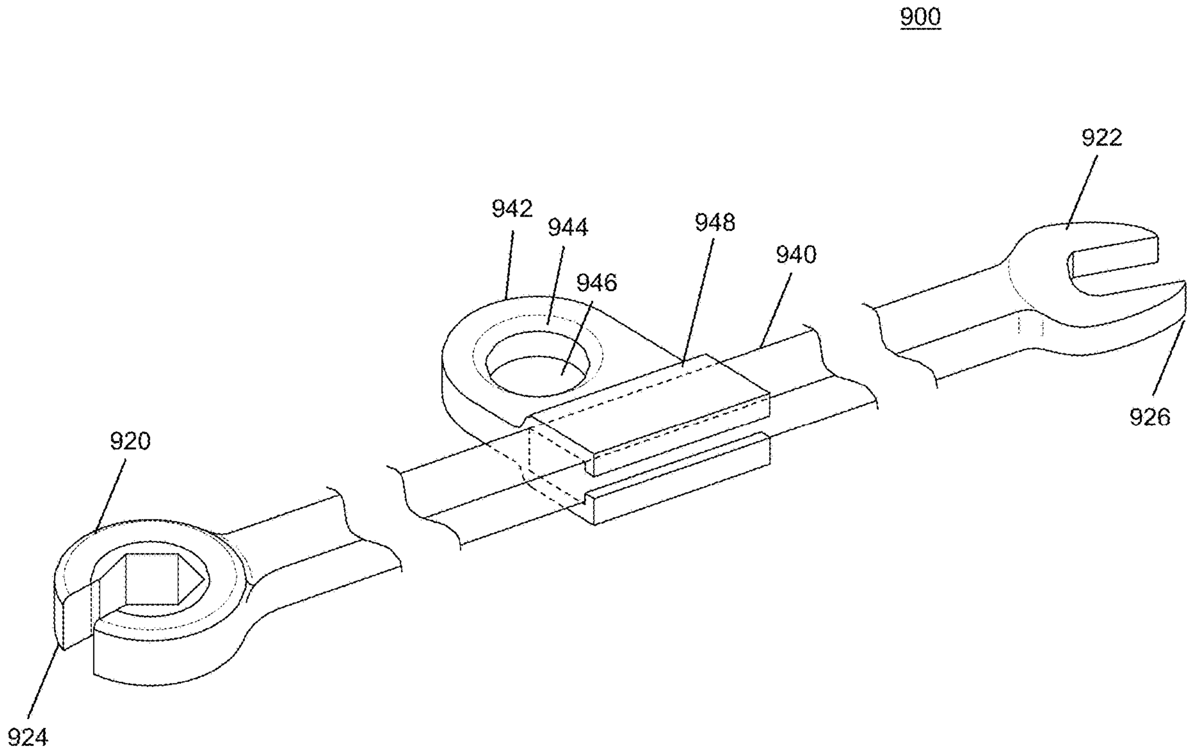
FIG. 13 is a perspective view of a ratchet tool according to one embodiment of the invention.

FIG. 13 illustrates another embodiment of a ratchet tool device 900. As shown, two head component 920, 922 is positioned on a first end 924 and a second end 926 of the ratchet tool device 900. While FIG. 13 shows each head component 920, 922 having an open head, it is contemplated that any type of wrench head can be used.

As shown in FIG. 13, ratchet tool device 900 further includes a control element 942 connected to a body component 940 via a securing element, such as clamp 948. Control element 942 is in the form of an opening 944 defined by a perimeter surface 946. Control element 942, as shown, is circular and centrally positioned to encompass a portion of the body component 940, but it is contemplated that control element 942 can be of any size and/or shape and connected anywhere to the body component 940 by different connectors, such as clamp 948. In operation, the user places one or more fingers within opening 946 and rotates the ratchet tool device 900. This permits a greater degree of rotation of the ratchet tool device 900, and therefore facilitates loosening or tightening hardware more quickly and efficiently as opposed to individual rotations of 0-30 degrees offered by conventional hand tools.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A hand wrench tool device operable by a user, the device comprising:
a head component including a ratchet mechanism;
two body components, each body component extending between a first end and a second end, each first end connected to the head component to form an angle of 90 degrees between each body component; and
each body component comprising a first control element separate and apart from a second control element, the first control element located within the body component and between the first end and the second end and forming a circle shape aperture defined by an inner perimeter surface, the second control element located between the first control element and the second end and forming an ovoid shape opening defined by an inner surface extending to the second end, each control element positioned directly on a centerline of the body component and configured to receive one or more finger digits of a user, and in operation the user applies pressure to one or more of the two control elements to rotate the hand tool device a continuous 360 degrees about the vertical centerline of the ratchet mechanism, while maintaining an angle of 90 degrees between the vertical centerline and a working surface.

2. The hand wrench tool device according to claim 1, further comprising a recessed portion along the perimeter edge of the body component.

3. The hand wrench tool device according to claim 1, further comprising a third control element separable from the body component and a securing element configured to connect the third control element to the body component.

4. The hand wrench tool device according to claim 3, wherein the securing element is a clamp connecting the one or more of the first control element and the second control element to the body component.

5. A hand wrench tool device operable by a user, the device comprising:
a head component including a ratchet mechanism;
a body component extending between a first end and a second end, the first end connected to the head component to form an angle of 90 degrees between the body components and a vertical centerline of the ratchet mechanism; and
the body component comprising of a first control element and a second control element, the first control element separate and apart from the second control element and both positioned directly on a centerline of the body component, the first control element located within the body element and between the first end and the second end and forming a circle shape aperture defined by an inner perimeter surface, the second control element located within the body component and between the first control element and the second end and forming an ovoid shape opening defined by an inner surface extending to the second end, wherein the first control element is configured to receive one finger digits of a user and the second control element is configured to receive a hand of a user, wherein the user applies pressure to one or more of the two control elements to rotate the body component a continuous 360 degrees about a vertical centerline of the ratchet mechanism, while maintaining an angle of 90 degrees between the vertical centerline and a working surface.

6. The hand wrench tool device according to claim 5, further comprising a recessed portion along the perimeter edge of the body component.

7. The hand wrench tool device according to claim 5 further comprising a securing element, wherein the securing element connects the first control element to the body component.

8. The hand wrench device according to claim 7, wherein the securing element is a clamp.

* * * * *